(12) United States Patent
Holbein et al.

(10) Patent No.: US 7,392,958 B2
(45) Date of Patent: Jul. 1, 2008

(54) BELT RETRACTOR FOR A SAFETY BELT

(75) Inventors: Wolfgang Holbein, Alfdorf (DE); Martin Butz, Waiblingen (DE); Daniel S. Helbich, Stuttgart (DE)

(73) Assignee: TRW Automotive GmbH, Alfdorf (DE)

( * ) Notice: Subject to any disclaimer, the term of this patent is extended or adjusted under 35 U.S.C. 154(b) by 79 days.

(21) Appl. No.: 11/375,888

(22) Filed: Mar. 15, 2006

(65) Prior Publication Data

US 2006/0208125 A1    Sep. 21, 2006

(30) Foreign Application Priority Data

Mar. 15, 2005   (DE) ................. 10 2005 011 904

(51) Int. Cl.
*B60R 22/38*   (2006.01)
(52) U.S. Cl. .............. 242/383.1; 242/374; 242/381; 242/384.1; 242/389; 280/806; 297/479; 297/480
(58) Field of Classification Search .......... 242/374, 242/381, 383.1, 384.1, 389, 396.9; 280/806; 297/479, 480
See application file for complete search history.

(56) References Cited

U.S. PATENT DOCUMENTS

| | | | |
|---|---|---|---|
| 3,648,810 A * | 3/1972 | Weatherby | 192/26 |
| 3,880,364 A * | 4/1975 | Andres | 242/371 |
| 4,056,242 A | 11/1977 | Herrmann | |
| 5,244,231 A * | 9/1993 | Bauer et al. | 280/807 |
| 6,216,973 B1 | 4/2001 | Bauer | |

FOREIGN PATENT DOCUMENTS

| | | |
|---|---|---|
| DE | 1940866 | 2/1971 |
| DE | 2442744 | 3/1976 |
| DE | 19950555 | 5/2000 |
| DE | 20207786 | 11/2002 |
| DE | 10234501 | 2/2004 |
| WO | 03076238 | 9/2003 |

\* cited by examiner

*Primary Examiner*—Peter M. Cuomo
*Assistant Examiner*—Stefan Kruer
(74) *Attorney, Agent, or Firm*—Tarolli, Sundheim Covell & Tummino LLP

(57) ABSTRACT

A belt retractor for a safety belt has a brake surface (38), a blocking mechanism (18), a brake element (24) which can prevent a steering in of the blocking mechanism (18), and a magnetic actuator (28). The brake element (24) is pressed against the brake surface (38) by means of the magnetic actuator (28).

6 Claims, 2 Drawing Sheets

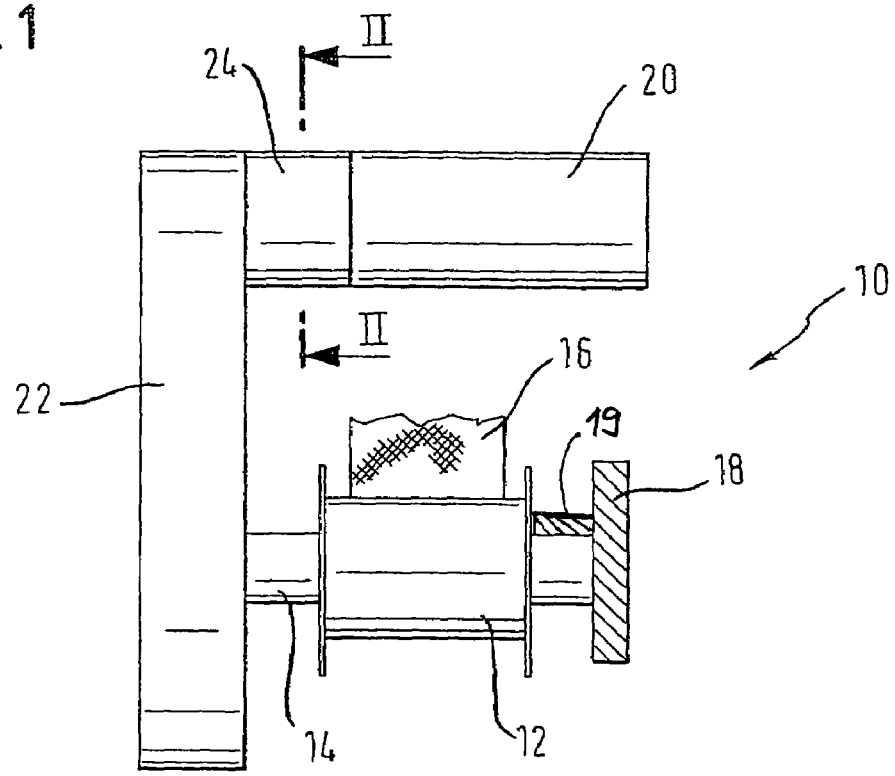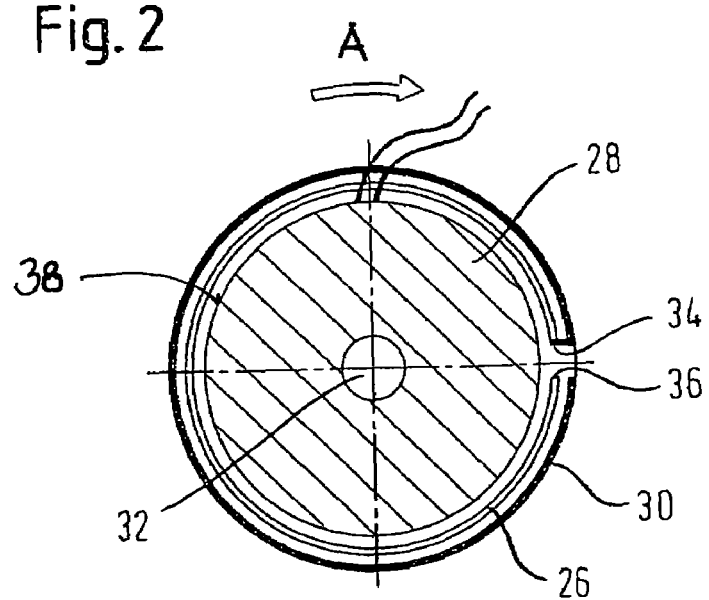

BELT RETRACTOR FOR A SAFETY BELT

TECHNICAL FIELD

The invention relates to a belt retractor for a safety belt.

BACKGROUND OF THE INVENTION

Such a belt retractor is part of an active vehicle occupant restraint system by which various precautions are taken in recognizing a critical vehicle situation, in order to protect a vehicle occupant from negative consequences in as optimum a way as possible. The steps that are taken may comprise, for example, changing the inclination of a backrest of a vehicle seat, closing vehicle windows, pre-tensioning the safety belt, and further measures. All these measures are reversible, which means that as soon as the status of the vehicle which was detected as being critical is no longer present, the vehicle is returned into its initial state again.

In belt retractors with a pre-tensioner drive, a known blocking mechanism can be activated, for example by a braking of the vehicle, when a belt spool is turned in a winding direction of the safety belt and the safety belt has been pre-tensioned. This can lead to a blocking catch, driven by the blocking mechanism, engaging fully into blocking teeth associated with it, when the belt spool is turned slightly in the unwinding direction, so that the belt spool is fully blocked. The blocking teeth are usually undercut so as to be able to reliably transfer between the blocking teeth and the blocking catch the high blocking loads which are active in the case of an accident. In order that the blocking catch can be moved out from the blocking teeth again, a back rotation of the belt spool in the winding direction is necessary. As the safety belt is in any case already pre-tensioned, the vehicle occupant feels this to be uncomfortable.

Various designs are known from the prior art, by which the undesired blocking of the belt spool is to be prevented, by the steering in of the blocking catch being prevented. In such designs, however, a comparatively complicated assembly is necessary.

The object of the invention consists in further developing a belt retractor in that an undesired steering in of the blocking catch is reliably prevented with as little effort as possible.

BRIEF SUMMARY OF THE INVENTION

According to the invention, a belt retractor for a safety belt has a brake surface, a blocking mechanism, a brake element which can prevent a steering in of the blocking mechanism, and a magnetic actuator. The brake element is pressed against the brake surface by means of the magnetic actuator. The invention is based on the basic idea of not acting on the mechanism which is controlling the blocking catch, but rather directly preventing a steering in of the blocking catch to prevent the undesired steering in of the blocking mechanism and, in so doing, in particular of the blocking catch. A steering in of the blocking catch is prevented by a rotation of the belt spool in the unwinding direction being prevented when the safety belt is in the pre-tensioned condition. In the absence of the rotation of the belt spool in the unwinding direction of the safety belt, the blocking catch can not engage into blocking teeth of the blocking mechanism. In this way, the blocking catch can be prevented from being steered into the blocking teeth in an undesirable manner, with comparatively little effort and in a space-saving arrangement.

The brake element is preferably constructed as a ring. The ring is mounted here such that the ring has a self-energizing effect in a braking process.

The brake element is preferably constructed as a spring ring. A spring ring is a space-saving element. The space-saving aspect is particularly important here in belt retractors. In addition, no restoring element is necessary in a spring ring in order to move the spring element back into the initial position in which the spring ring does not lie against the brake surface.

Preferably, the magnetic actuator has an outer surface which serves as a brake surface. The outer surface of the magnetic actuator can therefore serve as a brake surface. This makes a space-saving arrangement possible, because the magnetic actuator can undertake several tasks.

The spring ring preferably has a mounted end and a free end, the mounted end of the spring ring being mounted on the outer ring in the winding direction before the free end of the spring ring, in order to have a self-energizing effect upon activation of the actuator. As the free end of the spring ring is situated in the direction of movement after the end mounted on the outer ring, a self-energizing effect is achieved upon a braking of the movement. The self-energizing effect is therefore ensured through the selected arrangement of the bearing point on the outer ring.

BRIEF DESCRIPTION OF THE DRAWINGS

FIG. 1 shows a diagrammatic sectional view of a belt retractor according to the invention, with a brake element, FIG. 2 shows a sectional view of the belt retractor along the line II-II in FIG. 1 with the brake element in a first position.

BRIEF DESCRIPTION OF THE PREFERRED EMBODIMENT

Figure 3:
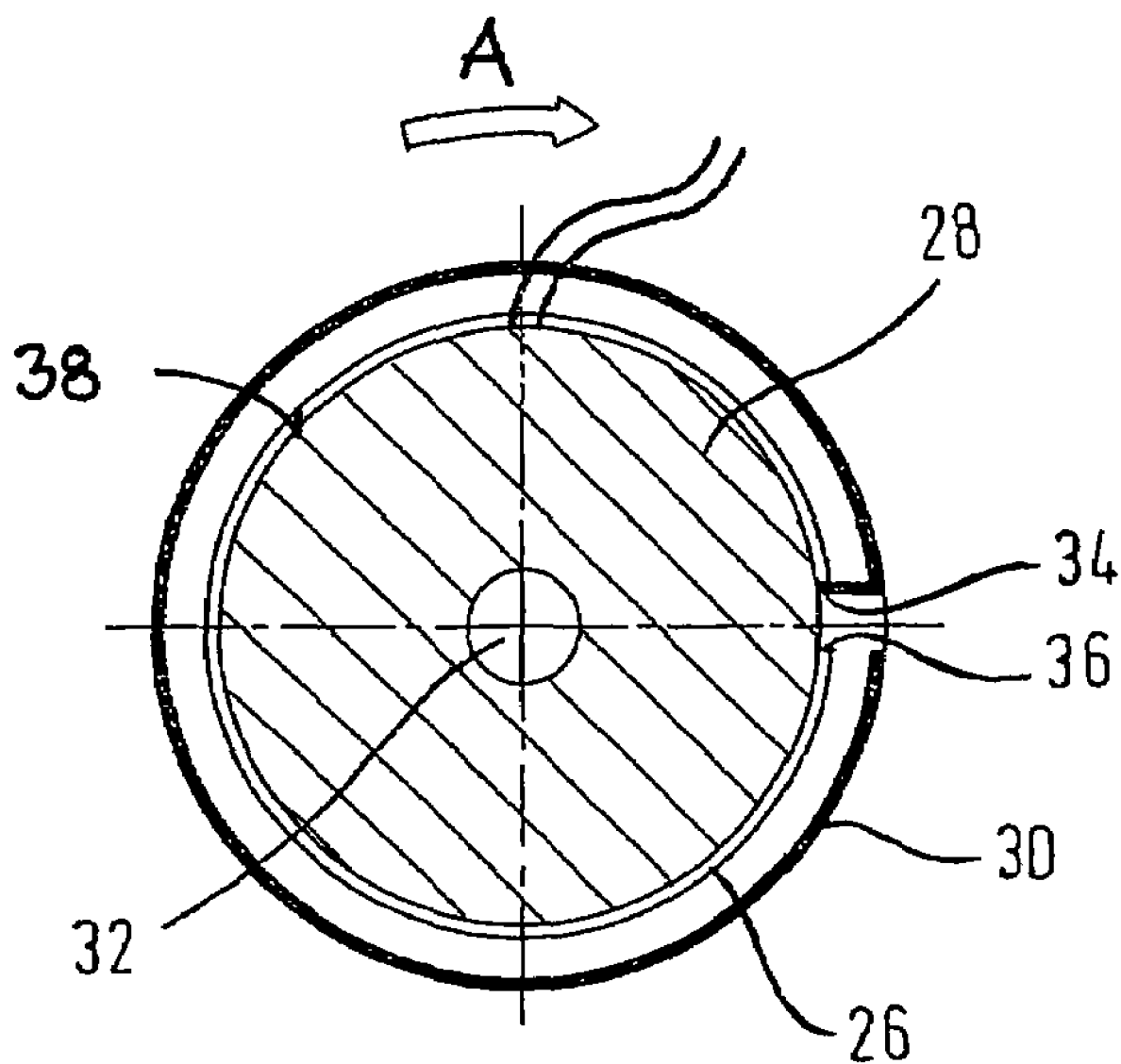
FIG. 3 shows a sectional view according to FIG. 2 with the brake element in a second position.

In FIG. 1 a belt retractor 10 is shown diagrammatically. The belt retractor 10 has a belt spool 12 which is arranged on a belt retractor shaft 14. A safety belt 16 can be wound onto the belt spool 12 and unwound from the belt spool 12.

A blocking mechanism 18 is provided, which can actuate a diagrammatically shown blocking catch 19, such that the belt spool 12 can be blocked against a rotation in the unwinding direction of the safety belt 16.

In addition, a pre-tensioner drive is provided, which is shown diagrammatically, which has a drive motor 20 and a gear 22. The drive motor 20 can turn the belt spool 12 and the belt retractor shaft 14 via the gear 22 both in a winding direction A and also in an unwinding direction.

A brake element 24, which can prevent a steering in of the blocking mechanism 18, in particular of the blocking catch 19, is arranged between the drive motor 20 and the gear 22 and is described in detail below. The brake element 24 can likewise be arranged between the gear 22 and the belt retractor shaft 14 or in front of the drive motor 20 (not shown).

The brake element 24 can be constructed as a ring and is illustrated in FIGS. 2 and 3 as a spring ring 26. The spring ring 26 has two ends 34, 36, one end 34 being mounted on an outer ring 30 and one end 36 not being mounted. The spring ring 26 is arranged in a gap between an actuator 28 and the outer ring 30.

The actuator 28 is constructed as an electromagnet and can be actuated electrically by excitation of a coil. The actuator 28 has a magnet coil body of cylindrical construction which has a shaft 32 which is connected with the belt retractor shaft 14.

When the actuator 28 is not activated (FIG. 2), the actuator 28, which is connected with the belt retractor shaft 14 and the drive motor 20, moves clockwise (see arrow). The spring ring 26 is situated between the actuator 28 and the outer ring 30 and in this position does not lie against the outer surface of the actuator 28 which serves as a brake surface 38.

When the actuator 28 is activated (FIG. 3), the spring ring 26 is moved to the brake surface 38 of the actuator 28 and lies against it (FIG. 3). As the actuator 28 is an electromagnetic actuator, a closed magnetic circuit forms in the position shown in FIG. 3, such that high holding forces are produced. By the abutting of the brake element 24, the rotation of the belt retractor shaft 14 in the unwinding direction is prevented. Thereby, an engaging of the blocking catch 19 is prevented with the safety belt 16 in the pre-tensioned condition, by a return rotation of the belt spool 12 being prevented.

As the end 34 of the spring ring 26, which is mounted on the outer ring 30, is arranged in the winding direction A before the free end 36 of the spring ring 26, the spring ring 26 has a self-energizing effect upon an activation of the actuator 28 and a braking of the rotational movement of the actuator 28 associated therewith. Owing to the frictional forces between the spring ring 26 and the brake surface 38 and the resulting sling friction, the spring ring 26 is pulled closer against the actuator 28 when the actuator 28 attempts to rotate in the unwinding direction of the belt webbing. In particular, the free end 36 is pressed towards the mounted end 34. The friction of the spring ring 26 against the brake surface 38 is therefore sufficiently high to achieve a braking of the rotary movement of the belt spool 12 and to prevent the belt spool 12 from making a rotary movement in the unwinding direction until a state of the vehicle has passed which caused the blocking mechanism 18 to respond. The spring element 26 therefore efficiently prevents an engagement of the blocking catch 19.

If the magnet circuit is opened, the spring ring 26 moves back by itself into the initial position according to FIG. 2, such that the brake element 24 is able to be re-used immediately and no restoring element is necessary.

An engaging of the blocking catch 19 is therefore prevented with a space-saving brake element 24 which is simple to produce.

The invention claimed is:

1. A belt retractor for a safety belt (16), comprising
   a belt spool (12),
   a drive motor (20),
   a brake surface (38),
   a blocking mechanism (18) having a blocking catch (19),
   a brake element (24) which can prevent a steering in of said blocking catch (19) of said blocking mechanism (18) by preventing a rotation of said belt spool (12) in an unwinding direction when said safety belt (16) is in a pre-tensioned condition, and
   a magnetic actuator (28),
   said brake element (24) being pressed against said brake surface (38) by means of said magnetic actuator (28).

2. The belt retractor according to claim 1, characterized in that said brake element (24) is constructed as a ring.

3. The belt retractor according to claim 1, characterized in that said magnetic actuator (28) has an outer surface which serves as said brake surface (38).

4. The belt retractor according to claim 1, characterized in that said magnetic actuator (28) is able to be actuated electrically.

5. The belt retractor according to claim 2, characterized in that said brake element (24) is constructed as a spring ring (26).

6. The belt retractor according to claim 5, characterized in that an outer ring (30) is arranged and said spring ring (26) has a mounted end (34) and a free end (36), said mounted end (34) of said spring ring (26) being mounted on said outer ring (30) in a winding direction (A), said free end (36) of said spring ring (26) being disposed beyond said mounted end (34) in the winding direction (A) in order to have a self-energizing effect upon an activation of said magnetic actuator (28).

* * * * *